UNITED STATES PATENT OFFICE.

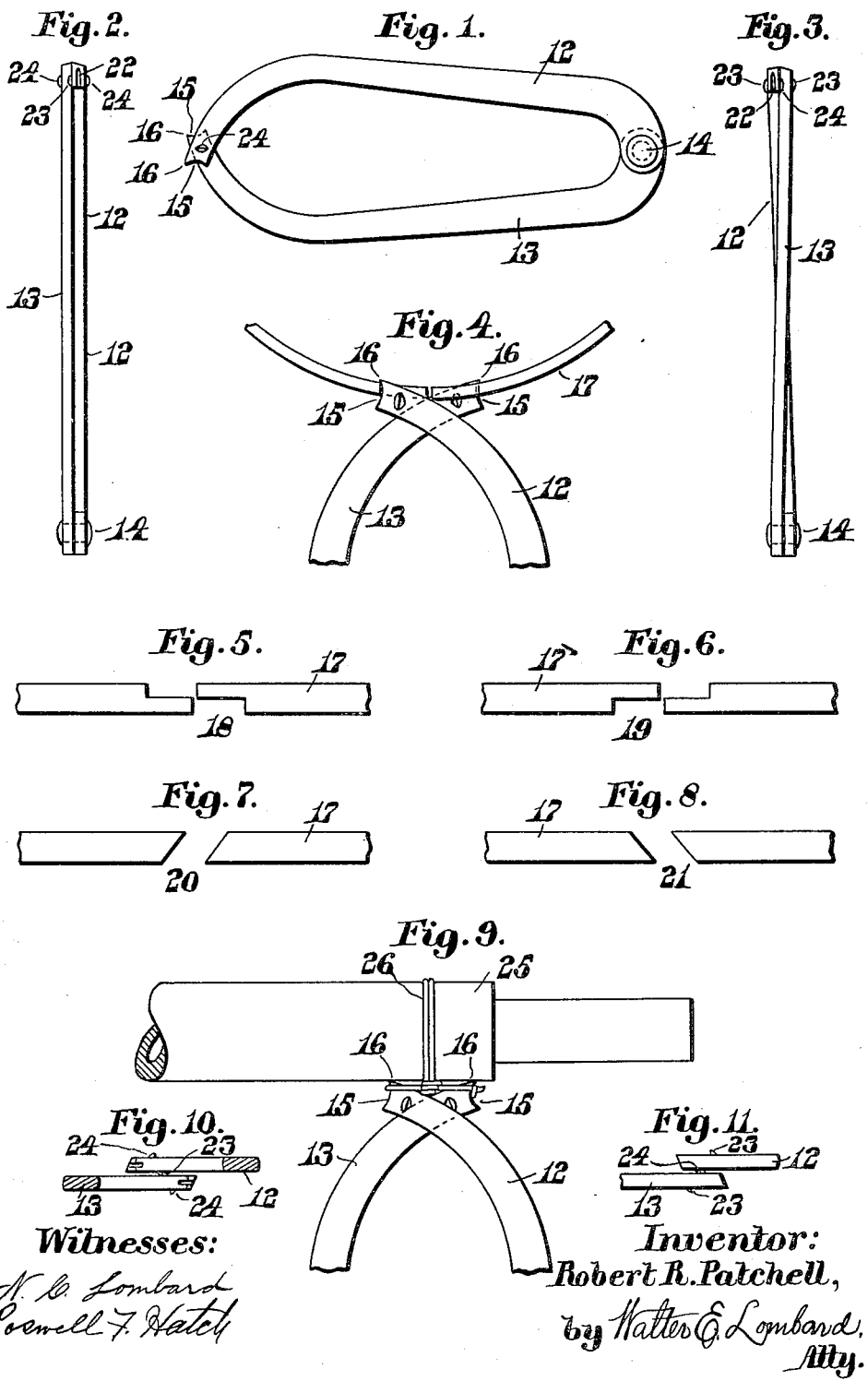

ROBERT R. PATCHELL, OF CAMBRIDGE, MASSACHUSETTS.

PISTON-RING SPREADER.

1,117,083.  Specification of Letters Patent.  Patented Nov. 10, 1914.

Application filed April 13, 1914. Serial No. 831,666.

*To all whom it may concern:*

Be it known that I, ROBERT R. PATCHELL, a citizen of the United States of America, and a resident of Cambridge, in the county of Middlesex and State of Massachusetts, have invented certain new and useful Improvements in Piston-Ring Spreaders, of which the following is a specification.

This invention relates to combination tools and particularly to devices adapted to be used in removing packing rings from pistons and replacing said rings on said pistons.

The object of the invention is to provide a simple tool for the purpose which may be used in connection with any form of split packing ring and which may be used equally as well for many other purposes, as, for instance, twisting wire around a hose or other pipe.

The invention consists of two members pivoted together with their movable ends normally crossing each other and provided with working jaws each having a concaved recess and a depression therein.

The invention further consists in certain novel features of construction and arrangement of parts which will be fully understood by reference to the description of the drawings and to the claims hereinafter given.

Of the drawings: Figure 1 represents a plan of a tool embodying the features of the present invention. Fig. 2 represents an edge view of the same. Fig. 3 represents a similar view with the members sprung so that the outer faces thereof as shown in Fig. 2 are adjacent to each other. Fig. 4 represents an enlarged plan of a portion of the tool applied to a packing ring. Figs. 5, 6, 7, and 8 represent different forms of split rings with which the improved tool is adapted to operate. Fig. 9 represents a view showing the tool used in twisting wires around a hose or other pipe. Fig. 10 represents a section through the pivoted members and showing the means for registering the opening of the jaws, and Fig. 11 represents an end view of said jaws showing the other set of registering members.

Similar characters designate like parts throughout the several figures of the drawings.

In the drawings, 12 and 13 are two members connected together at one end by the pivot member 14. The opposite or movable ends of the members 12 and 13 overlap and cross each other as indicated in Fig. 1. In normal position, two faces of said members 12 and 13 are adjacent as indicated in Fig. 2, while in abnormal position the members 12 and 13 may be sprung so that the opposite faces thereof will be adjacent to each other as indicated in Fig. 3 of the drawings. The extreme end of each member is provided with a concaved recess 15 forming a projecting finger 16, this finger being adapted to enter between the split ends of a packing ring 17 to separate the ends in removing it from a piston or for the purpose of spreading it so that the ring may be placed in position in a groove upon the periphery of said piston. Packing rings 17 are split or divided in various manners as indicated in Figs. 5 to 8 inclusive of the drawings, the division line indicated at 18 in Fig. 5 of the drawings being the reverse of the division line 19 indicated in Fig. 6 of the drawings, and the division 20 indicated in Fig. 7 being the reverse of division 21 indicated in Fig. 8 of the drawings. The packing ring in the form shown in Fig. 5 of the drawings has square ends with which the projecting fingers 16 are adapted to engage. It is obvious that these projecting fingers would not engage the inclined faces of the packing rings indicated in Figs. 7 and 8 of the drawings and to provide means for spreading this type of packing ring the concaved recesses 15 have each extending inwardly therefrom a recess 22 adapted to receive the pointed ends of the packing ring 17. When the members 12 and 13 are in the position indicated in Fig. 2, the working jaws are adapted to coact with the opposite ends of the forms of packing ring 17 shown in Figs. 5 and 7 of the drawings, and when it is desired to have them coact with the forms of packing ring shown in Figs. 6 and 8, the members 12 and 13 have to be sprung into the position shown in Fig. 3 of the drawings. In either case the movable ends of the members 12 and 13 are normally crossed and when the edges are positioned against the opposed ends of the packing ring the squeezing pressure of the hand on the members 12 and 13 will cause these members to be moved toward each other and the working jaws at the movable ends thereof separated, thereby expanding the rings either for the purpose of inserting them into the grooves of the piston or of removing them therefrom.

The adjacent faces of the members 12 and 13 as viewed in Fig. 2 have extending therefrom stop members 23 which are formed integral with said members and are adapted to engage with one another to limit the outward movement of the members 12 and 13 about the pivot 14. On the opposite faces of the members 12 and 13 are similar stop members 24 differently positioned relative to the ends of said members and serving the same purpose as the projections 23 when the members 12 and 13 are in the position shown in Fig. 3 of the drawings. These members 23 and 24 are preferably positioned relative to the ends of said members 12 and 13 so that the projecting fingers 16 will be separated just the right distance to enter the slits in and engage with the ends of the packing rings 17, these rings for gasolene engines being usually in two sizes and with the slits in one size differently spaced from the other size. When the tool is used to remove a packing ring the whole ring is expanded, the strain being evenly distributed over the entire surface, which is quite different from the results obtained when screw drivers or other similar means are used to pry the ring from its groove.

The tool may be used for several other purposes, as for instance, when it is desired to repair a hose or other pipe 25 by binding it with wire 26, loops being formed in the ends of the wire 26, and then the jaws of the members 12 and 13 are inserted in the loops, and the wire is twisted as indicated in Fig. 9 of the drawings. The tool is adapted for use also either as inside or outside calipers. It is believed that the many advantages of a tool of this kind will be fully understood from the foregoing description.

Having thus described my invention, I claim:

1. A tool consisting of two members pivoted together at one end and adapted to cross each other near the opposite ends which ends are provided with concaved recesses extending transversely of said members and facing outwardly in opposite directions.

2. A tool consisting of two members pivoted together at one end and adapted to cross each other near the opposite ends which ends are provided with concaved recesses extending transversely of said members, and terminating in extensions with sharp edges facing outwardly in opposite directions.

3. A tool consisting of two members pivoted together at one end and adapted to cross each other near the opposite ends which ends are provided with concaved recesses extending transversely of said members and facing outwardly in opposite directions on opposite sides of the point of crossing of said members, and stop members projecting from adjacent faces of said members.

4. A tool consisting of two members pivoted together at one end and having the opposite ends crossing and provided with transverse recesses having walled depressions extending therefrom, said recesses being located on opposite sides of the point of crossing and facing outwardly therefrom.

5. A tool consisting of two members pivoted together, said members having recessed jaws normally facing outwardly from each other and adapted to be further separated when said members are moved inwardly about the pivotal connection.

6. A tool consisting of two members pivoted together, said members having recessed jaws normally facing outwardly from each other and adapted to be further separated when said members are moved inwardly about their pivotal connection, and each recess having a walled depression extending therefrom.

7. A tool consisting of two members pivoted together, said members being adapted to cross each other on either face and provided with working jaws normally facing outwardly from each other and adapted to be further separated when said members are moved inwardly, the opposite faces of said members having stop members extending therefrom at different distances from said jaws.

Signed by me at 4 Post Office Sq., Boston, Mass., this 10th day of April, 1914.

ROBERT R. PATCHELL.

Witnesses:
WALTER E. LOMBARD,
NATHAN C. LOMBARD.